No. 613,591. Patented Nov. 1, 1898.
W. A. McWHORTER.
FERTILIZER DISTRIBUTER.
(Application filed Feb. 19, 1898.)
(No Model.) 2 Sheets—Sheet 1.
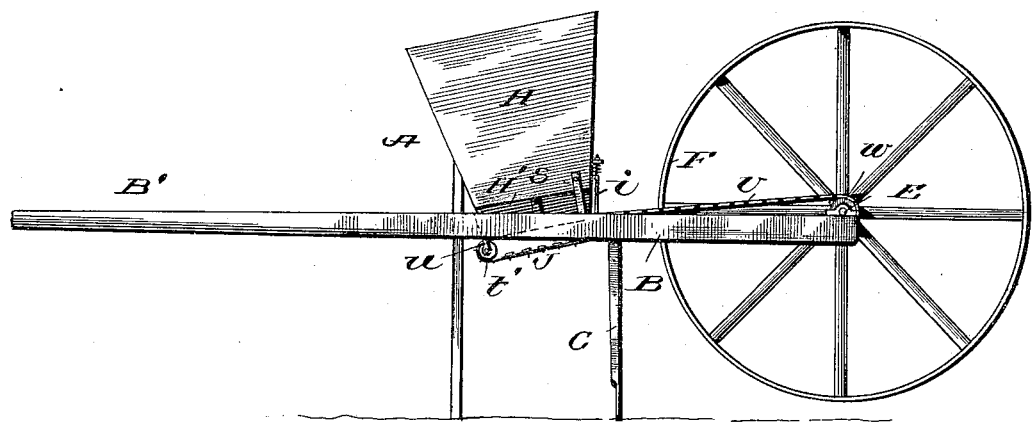
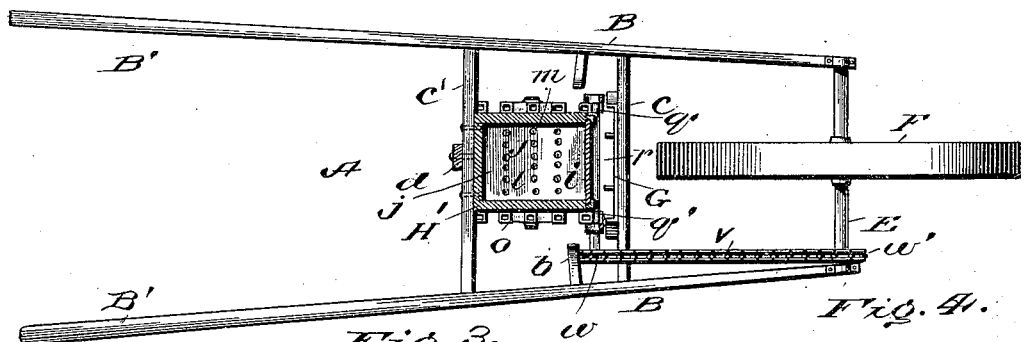
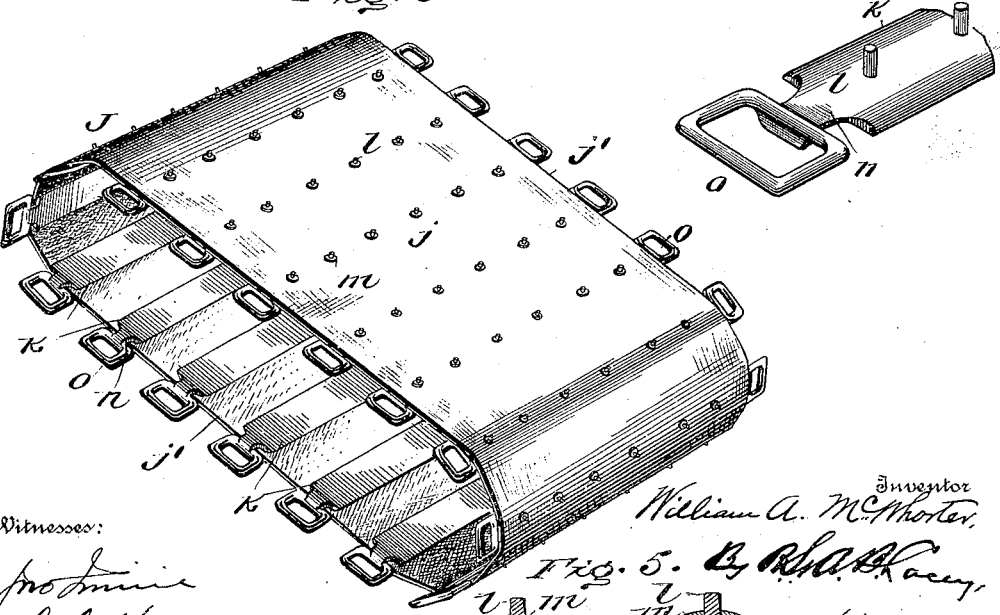
Witnesses: Inventor
William A. McWhorter,
By R. S. & A. B. Lacey,
his Attorneys.

No. 613,591. Patented Nov. 1, 1898.
W. A. McWHORTER.
FERTILIZER DISTRIBUTER.
(Application filed Feb. 19, 1898.)
(No Model.) 2 Sheets—Sheet 2.
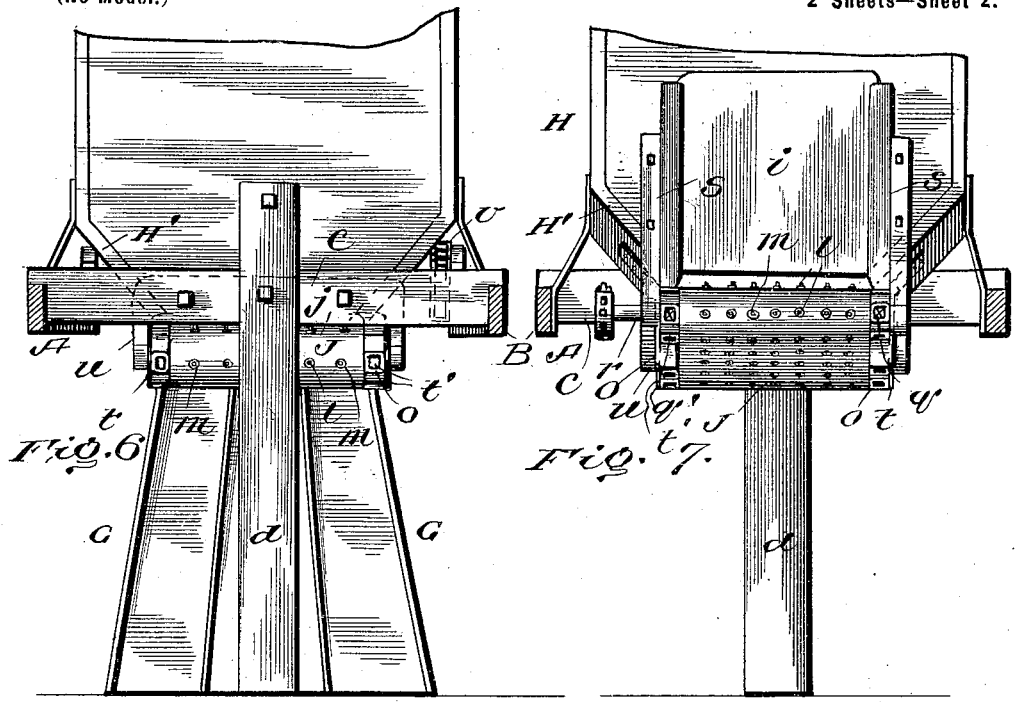
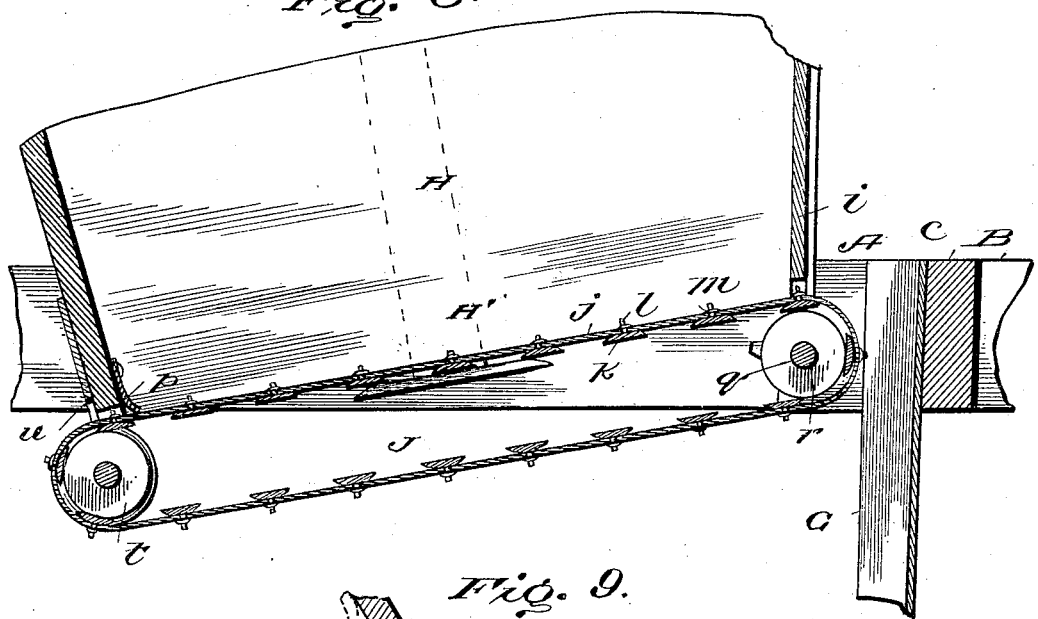
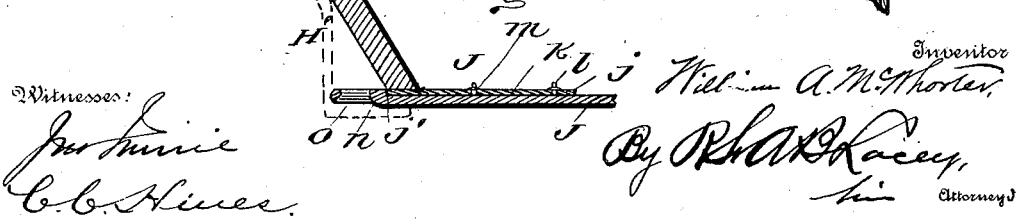

UNITED STATES PATENT OFFICE.

WILLIAM A. McWHORTER, OF NORFOLK, VIRGINIA.

FERTILIZER-DISTRIBUTER.

SPECIFICATION forming part of Letters Patent No. 613,591, dated November 1, 1898.

Application filed February 19, 1898. Serial No. 670,961. (No model.)

*To all whom it may concern:*

Be it known that I, WILLIAM A. McWHORTER, a citizen of the United States, residing at Norfolk, in the county of Norfolk and State of Virginia, have invented certain new and useful Improvements in Fertilizer-Distributers; and I do hereby declare the following to be a full, clear, and exact description of the invention, such as will enable others skilled in the art to which it appertains to make and use the same.

My invention relates to improvements in fertilizer-distributers, and particularly to the mechanism thereof which feeds the fertilizer from the hopper to the discharge-chute.

The object of my invention is to provide a novel construction of feed-belt which will prevent the fertilizer from sticking and choking up the bottom of the hopper and feed the fertilizer in a loose condition and in the most effective manner.

To this end the invention consists in certain novel features of construction, combination, and arrangement of parts, as will be hereinafter more fully described, and particularly set forth in the appended claims.

In the accompanying drawings, forming part of this specification, Figure 1 is a side elevation of a fertilizer-distributer embodying my invention. Fig. 2 is a plan view of same, showing the hopper in horizontal section. Fig. 3 is a perspective view of the feed band or belt. Fig. 4 is a broken detail perspective view of a link or stay plate. Fig. 5 is a detail sectional view of a portion of the belt and parts. Fig. 6 is a vertical section of the frame, showing the hopper in rear elevation. Fig. 7 is a similar view showing the hopper in front elevation. Fig. 8 is a longitudinal section of the hopper. Fig. 9 is a transverse sectional view of the belt and one of the side walls of the hopper.

A in the drawings represents the frame of the distributer, consisting of the side bars B, extended to form the handles B', the cross-bars $c$ $c'$, and the supporting-leg $d$. E is the axle, and F the carrying-wheel, mounted thereon. G represents the discharge-chute, secured to the front cross-bar $c$, and H the inclined hopper, secured to the rear cross-bar $c'$. The fertilizer is discharged at the front of the hopper through an opening controlled by a valve or gate $i$. These parts may be of any well-known or desired construction.

The improvements to which the invention relates will now be described.

At the lower end of the hopper is an endless belt J, which forms the bottom thereof and feeds the fertilizer through the discharge-opening to the chute G, which conducts the same to the ground. This belt consists of an endless band $j$, of heavy canvas, ducking, or other suitable material, to the inner side of which are secured a continuous series of transverse metal link or stay plates $k$, which are spaced a suitable distance apart. These plates are preferably secured to the belt by rivet-spurs $l$, formed integrally therewith, which project through the belt and are fitted with washers $m$. A preferred manner of connecting these parts is to force the washers on the spurs, so that they will firmly engage the same by frictional contact, and to slightly expand and upset the spurs by means of a tubular punch, which obviates the necessity of heading the spurs and at the same time provides a simple and effective fastening. By this construction also the spurs, in addition to forming part of the fastening means, serve as stirrers to loosen up the fertilizer and prevent the formation of lumps and choking of the bottom of hopper by strings or other foreign matter. The link or stay plates $k$ are somewhat shorter that the width of the belt, so that their ends extend close up to but lie just inside of the side edges $j'$ of the belt. Each plate is provided at its opposite ends with extensions projecting beyond the edge of the belt and each consisting of an integral neck $n$, carrying a link-loop $o$. The neck is curved or offset upward above the plane of the upper or inner side of the plate and joined to the under side of the contiguous side bar of the link-loop. The said link-loop thus projects above the plate and in line with the belt, and the side edge $j'$ of the belt seats against the inner side bar of the loop, as clearly shown in Fig. 9. By this construction the edges of the belt are stiffened and the upper stretch of the belt is maintained in contact with the lower ends of the flaring bottom side walls H' of the hopper, so as to prevent the fertilizer from dropping out at the sides of the hopper. Loss of fertilizer at the rear of the hopper is prevented by a leather or felt flap $p$ on the rear wall thereof which bears upon the upper stretch of the belt.

The belt is mounted at the front upon sprockets $q\ q'$, carried by a transverse shaft $r$, having bearing in hangers $s$, and at the rear upon flanged wheels $t\ t'$, mounted on a shaft journaled in hangers $u$. The teeth of the sprockets are engaged by the link-loops $o$, and when the shaft $r$ is revolved in a forward direction the belt is driven and feeds the fertilizer through the discharge-opening at the front of the hopper to the chute G. It will be noted that the link-loops are not connected, as in the ordinary sprocket-gearing, by links and that the belt alone forms the connection between the stay-plates carrying said link-loops. I thus avoid the use of parts most liable to rust and at the same time provide a belt which is light, strong, durable, and flexible.

The shaft $r$ is driven by a chain $v$, passing over a sprocket $w$ thereon and a sprocket $w'$ on the axle E. This form of gearing, while deemed preferable, is not essential, as any other suitable gearing may be employed.

It will be understood that changes in the form, proportion, and minor details of construction may be made within the scope of the invention without departing from the spirit or sacrificing any of the advantages thereof.

Having thus fully described my invention, what I claim as new and useful, and desire to secure by Letters Patent, is—

1. In a fertilizer-distributer, a feed-belt having a series of transverse link or stay plates, each comprising in its construction a plate proper, a series of rivet-spurs projecting from one side thereof, a curved or offset neck on each end of the plate, and a link-loop carried by each neck, each link-loop having its inner side bar secured on its under side to the neck, whereby the said link-loop has position on a plane above the said side of the plate carrying the rivet-spurs, substantially as described.

2. An endless feed-belt for fertilizer-distributers, comprising in its construction a flexible belt or band, and a series of transverse link or stay plates secured to the inner side thereof, said plates being somewhat shorter than the width of the belt and formed at their opposite ends with extensions, each extension consisting of a curved or offset neck carrying a link-loop, the several link-loops being free from connection with each other and having their inner cross-bars arranged to bear against the side edges of the belt, substantially as described.

3. A feed-belt for fertilizer-distributers, comprising an endless belt or band, transverse link or stay plates arranged on the inner side of the band and provided with rivet-spurs projecting through the band and with end link-loops projecting beyond the edges of the band, and washers engaging said rivet-spurs, substantially as described.

4. A fertilizer-distributer comprising, in combination, a frame carrying a hopper, a shaft at the rear of the hopper carrying flanged wheels, a drive-shaft at the front of the hopper supported by hangers and carrying sprocket-wheels, an endless belt forming the bottom of the hopper and consisting of a band passing over said flanged wheels and having stay-plates provided with end link-loops engaging said sprocket-wheels, and means for operating said drive-shaft, substantially as described.

In testimony whereof I affix my signature in presence of two witnesses.

WILLIAM A. McWHORTER.

Witnesses:
   Jos. T. Nottingham,
   J. M. Goad.